United States Patent

Bolgar et al.

[11] 3,888,576
[45] June 10, 1975

[54] FILM PROJECTORS

[76] Inventors: Francis Bolgar, 24 Karamu St.; John James Fraser, 194 Helston St., both of Wellington, New Zealand

[22] Filed: Sept. 23, 1974

[21] Appl. No.: 508,647

Related U.S. Application Data

[63] Continuation-in-part of Ser. No. 278,196, Aug. 7, 1972, abandoned.

[52] U.S. Cl. .................................................. 353/76
[51] Int. Cl. ............................................ G03b 21/22
[58] Field of Search ............ 353/76, 77, 99; 355/56, 355/57, 58, 59, 60

[56] References Cited
UNITED STATES PATENTS

| | | |
|---|---|---|
| 2,204,709 | 6/1940 | Straubel et al. .......................... 353/76 |
| 2,742,815 | 4/1956 | Dietrich et al. .......................... 353/76 |
| 2,746,344 | 5/1956 | Pratt et al. ............................... 353/76 |
| 3,547,531 | 12/1970 | Wells ....................................... 353/76 |
| 3,604,795 | 9/1971 | Crandall .................................. 353/76 |

*Primary Examiner*—Harry N. Haroian
*Attorney, Agent, or Firm*—Strauch, Nolan, Neale, Nies & Kurz

[57] ABSTRACT

Apparatus is disclosed for enlarging and back-projecting an image on microfilm onto an essentially horizontal screen set at a fixed distance from the microfilm, the distance between reflecting surfaces and projecting lens and screen being alterable while a corresponding adjusting movement of the projecting lens, to maintain the image in focus, is effected by means of a pair of vertical camming members along which a framework supporting the reflecting surfaces moves.

6 Claims, 7 Drawing Figures

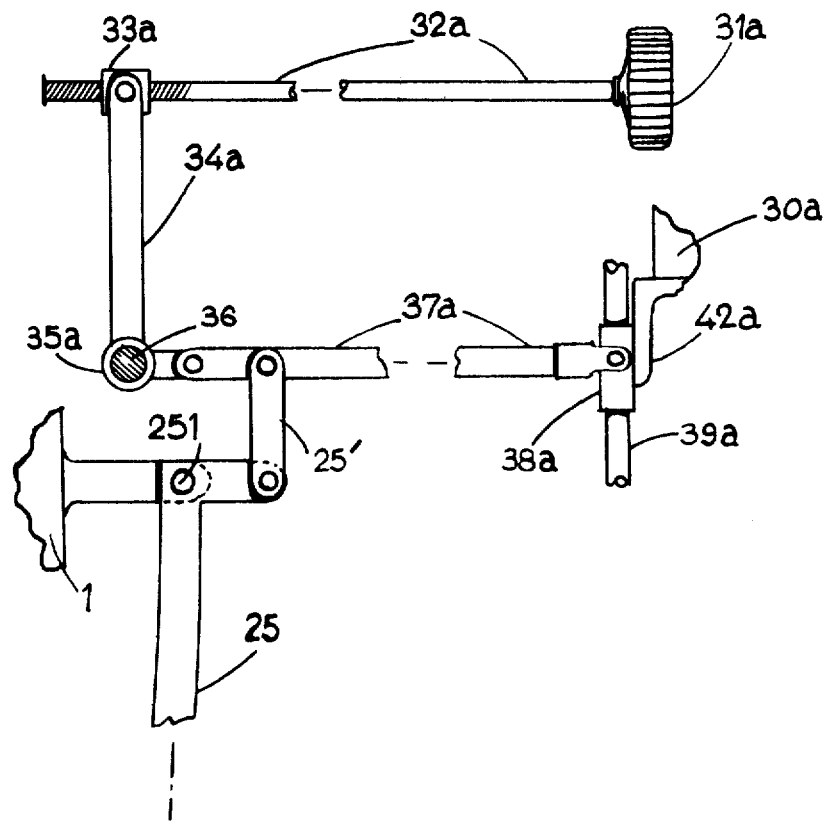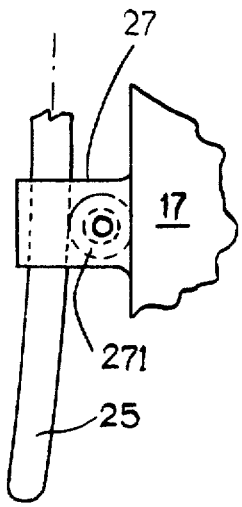
FIG. 7

FILM PROJECTORS

This application is a continuation-in-part of United States Patent application Ser. No. 278,196 filed on Aug. 7, 1972, now abandoned. The disclosure of said application is incorporated herein by reference.

This invention relates to an image projector and enlarger.

Projectors are known for the purpose of projecting an image contained on a strip of film onto for instance a screen, so that a suitable enlargement of the image can be obtained. The degree of enlargement obtained from such a projector is dependent upon the distance between the screen and the projector and the type of projection lens used. Single frames of photographic films generally referred to as microfilms, are often employed for the purpose of recording information in a condensed form and it is necessary that means be provided so that the image on such microfilm can be enlarged and suitably projected onto a screen. Particularly in the case of maps, plans and the like it is desirable that the image be displayed in a manner that it can readily be copied such as by tracing onto paper and thereby altered or modified as desired.

For this purpose the image must preferably be projected on the underside of a viewing screen formed of a translucent material so that paper can be placed on the viewing screen to allow the image to shine through the screen and through the paper to enable a tracing to be made. Preferably the viewing screen is arranged at bench height and for this purpose it should be substantially horizontal or tilted at a slight angle thereto for easy working and viewing. Furthermore it is desirable that the microfilm holding mechanism, the projection mechanism and the viewing screen be housed within a single cabinet or the like of compact dimensions. If for instance a viewing screen of 24 × 17 inches is required then it is not normally practical to beam the image directly from the projecting lens to the viewing screen, since unless a special lens is used, the distance between the projecting lens and the viewing screen would be too great to enable the viewing table to be placed at a substantially horizontal position to the ground and yet be at a convenient working height. In any event it is not possible when using such a lens to obtain an enlargement which is not distorted to a significant degree. It is therefore necessary that prisms, mirrors or the like be used so that the path of the beam from the projecting lens can be increased. This can be obtained for instance by aiming the projecting lens downwardly and then bending the beam twice through 90° so as to project the beam upwardly onto the underside of the viewing table.

Viewing apparatus such as described above are known but they suffer from the disadvantage that only fixed enlargements can be obtained thus severely restricting their use.

Apparatus is also known in which the degree of enlargement of a projected image can be varied while the image is maintained in focus. U.S. Pat. No. 2,746,344 to V. E. Pratt et al discloses and claims such an apparatus in which the adjusting movement is effected by a camming arrangement.

It is therefore an object of this invention to provide an improved viewing device which will enable the image carried on a film to be enlarged within preset limits and to be projected onto the underside of a fixed screen, the said projection apparatus, enlarging equipment and viewing screen being included within a single cabinet.

It is also an object of this invention to provide a means whereby any desired enlargement within the upper and lower limits can be obtained.

It is a further object of this invention to provide an apparatus in which the distance between the reflecting surfaces and the projecting lens and screen can be altered while a corresponding adjusting movement to the projecting lens is simultaneously effected to maintain the image in focus on the screen, the apparatus being characterised in that this adjusting movement is effected by means of an improved cam arrangement.

According to the invention there is provided an apparatus for projecting the image contained on transparent film onto a screen set at a fixed distance from the film, said apparatus being contained in a cabinet and including an optical arrangement whereby light issuing from a lamp is beamed through a primary condensing lens so as to emerge in a parallel beam and pass through a heat shield, reflect off a mirror, pass through a secondary condensing lens and converge through the film to a point within the boundaries of a projecting lens, diverge out of the projecting lens and pass onto a pair of angularly disposed reflecting surfaces before being reflected onto a transparent screen, and wherein the distance between the reflecting surfaces and the projecting lens and screen can be altered while a corresponding adjusting movement to the projecting lens is simultaneously effected to maintain the image in focus on the screen; characterised in that the adjusting movement is effected by means of a cam arrangement comprising a vertically disposed, elongated camming member pivoted at its upper end to said cabinet, a link pivotally connected to said camming member adjacent said upper end thereof, and connected to an arm carrying said projecting lens, and a cam-follower provided on a framework supporting the reflecting surfaces and slidably engaging the camming member; the camming member being shaped in such a manner that as the framework supporting the reflecting surfaces moves towards or away from the screen, the camming member is caused to pivot and thus to move said link which in turn moves said arm to produce said corresponding adjusting movement to the projecting lens.

A preferred embodiment of the invention will now be described with reference to the accompanying drawings, in which:

FIG. 7 shows the cam arrangement in greater detail.

Figure 1:
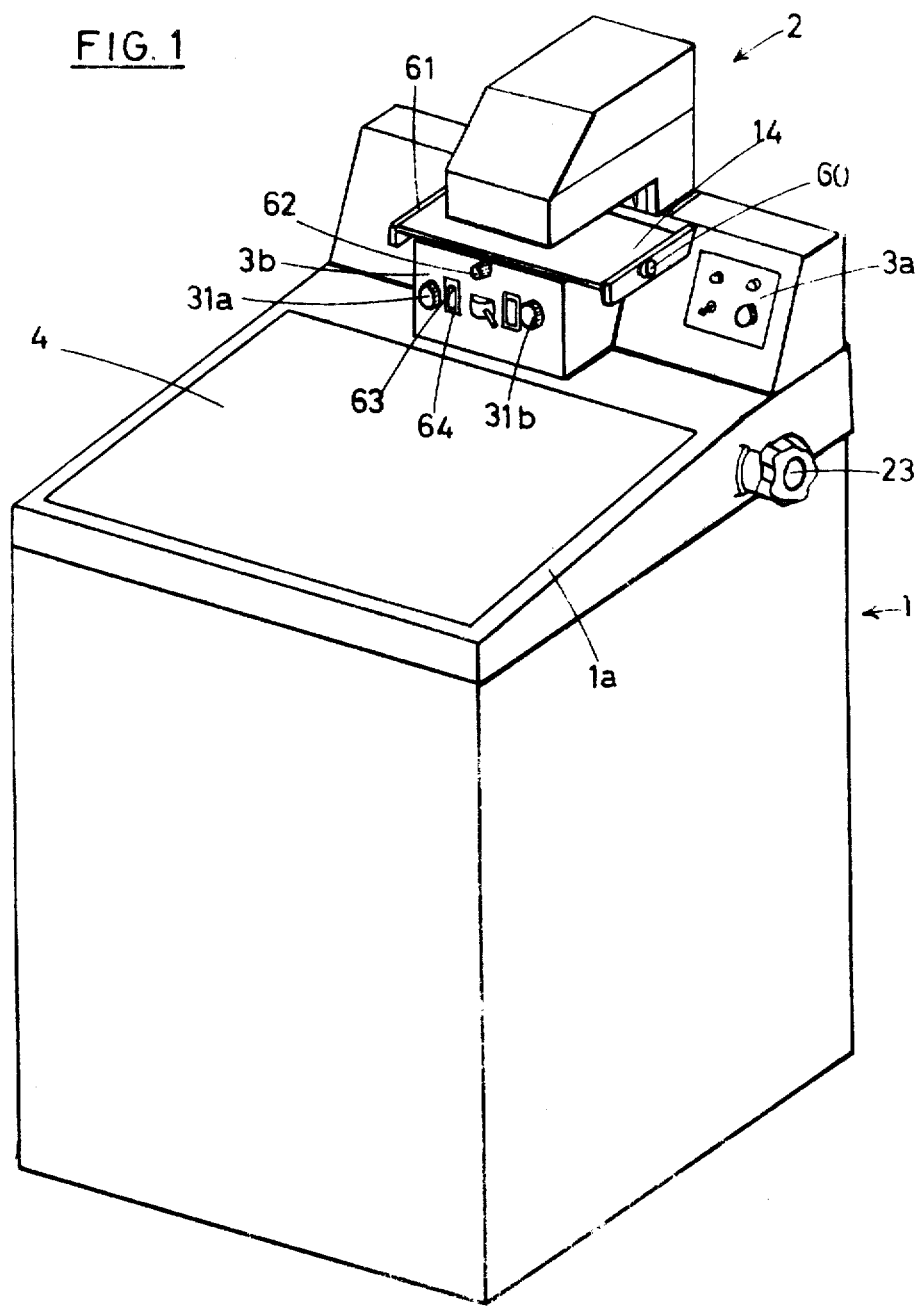
FIG. 1 is an elevational view of the apparatus.

The apparatus as shown in the drawings comprises a free standing cabinet, indicated generally at 1, within which is housed an image reflection system and atop of which a lens system 2, control panels 3a and 3b and viewing screen 4 are located.

The cabinet 1 is formed from sheet metal, moulded resin bonded glass fibre, or the like and has an upper surface 1a which preferably slopes downward from the control panels 3 at a slight angle of for instance four degrees with respect to the horizontal. This allows the viewing screen 4, located in the forward portion of the upper surface, to be arranged at a most convenient position for observation and tracing of the image projected thereon. The viewing screen 4 is fabricated out of translucent rigid plastic, ground sheet glass, or the like, and is such as to enable the image to be projected on the underside thereof so that the image will shine through the screen. The screen should be of sufficient rigidity to support normal working loads such as would be imposed when the image is being traced by hand.

The interior of the cabinet houses a reflector system and associated pulleys and cams to enable the required magnification to be attained as will hereinafter be described.

The lens system 2 (see particularly FIGS. 2 and 3) houses a light source 5, semi-spherical reflector 6, condensing lenses 7a and 7b, heat filter 8, mirror 9, and projecting lenses 11a and 11b. The overall arrangement of the optical system is illustrated schematically in FIG. 2.

Figure 2:
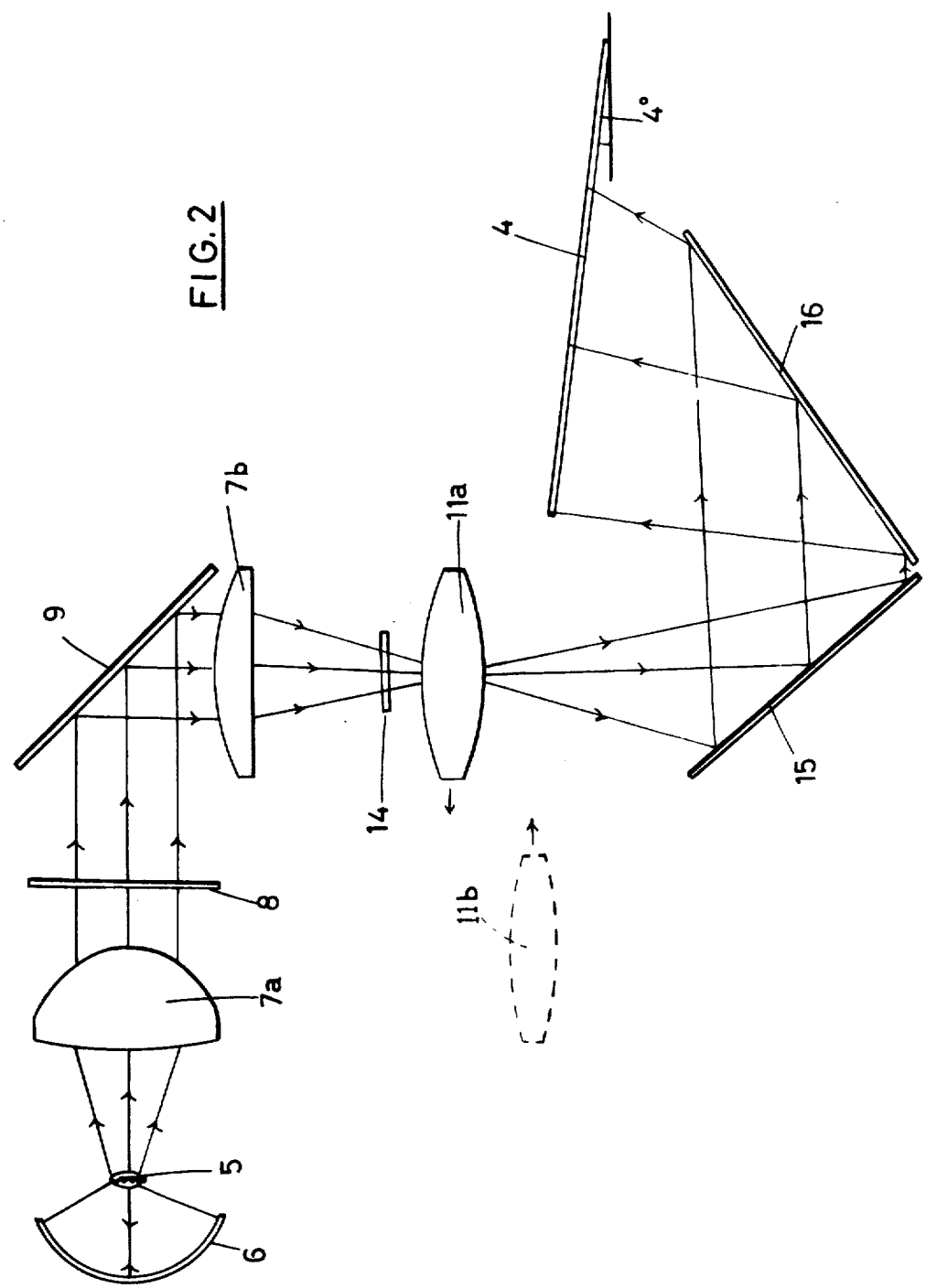
FIG. 2 is a schematic view of the optical arrangement.
Figure 3:
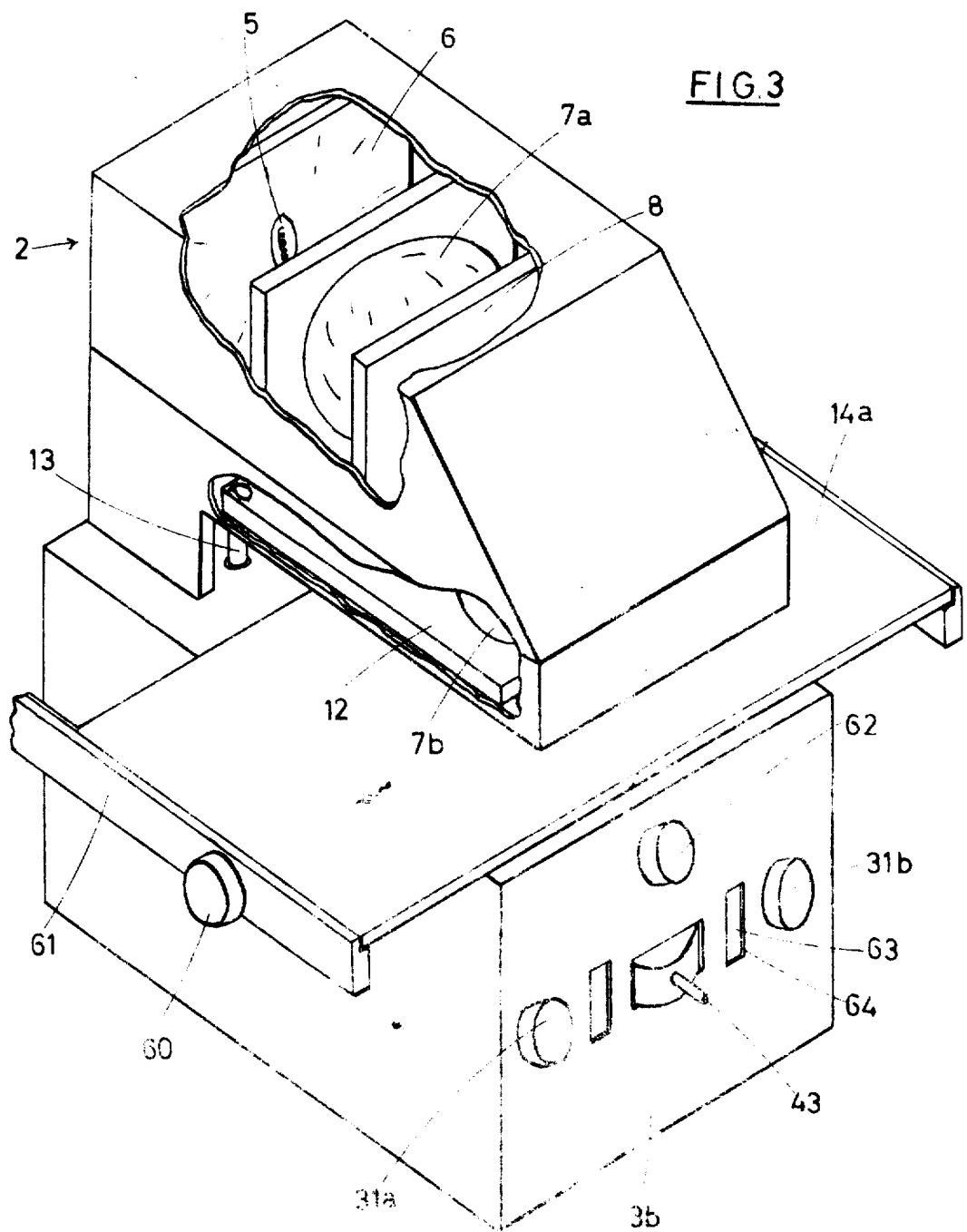
FIG. 3 is an enlarged partially cut-away view of the lens housing.

The optics are arranged so that light issuing from a lamp, such as a 100 watt quartz-halogen lamp, is beamed through a condensing lens 7a as shown by the arrowed rays in FIG. 2. The codensing lens 7a acts to converge the rays into a parallel beam of concentrated light. The light beam then passes through a heat shield 8 and then on to reflect off a mirror 9 arranged at 45° to the incident beam. The reflector, light source, condensing lens 7a, heat shield 8 and mirror 9 are held in fixed positions in a horizontal plane as shown in FIG. 3.

A further condensing lens 7b is located below the plane of the aforementioned optics and arranged so as to collect the light reflected from the mirror 9 and converge it to a point within the boundaries of the projecting lens 11a or 11b. The condensing lens 7b has up and down movement on a vertical axis on support 12, see FIG. 3. The vertical movement of the support is achieved by means of the attached props 13 as will hereinafter be described.

A film 14 is arranged in the light beam between the condensing lens 7b and the projecting lens 11a or 11b. The film 14 is held in position on a plate 14a which has horizontally controlled movement.

Figure 4:
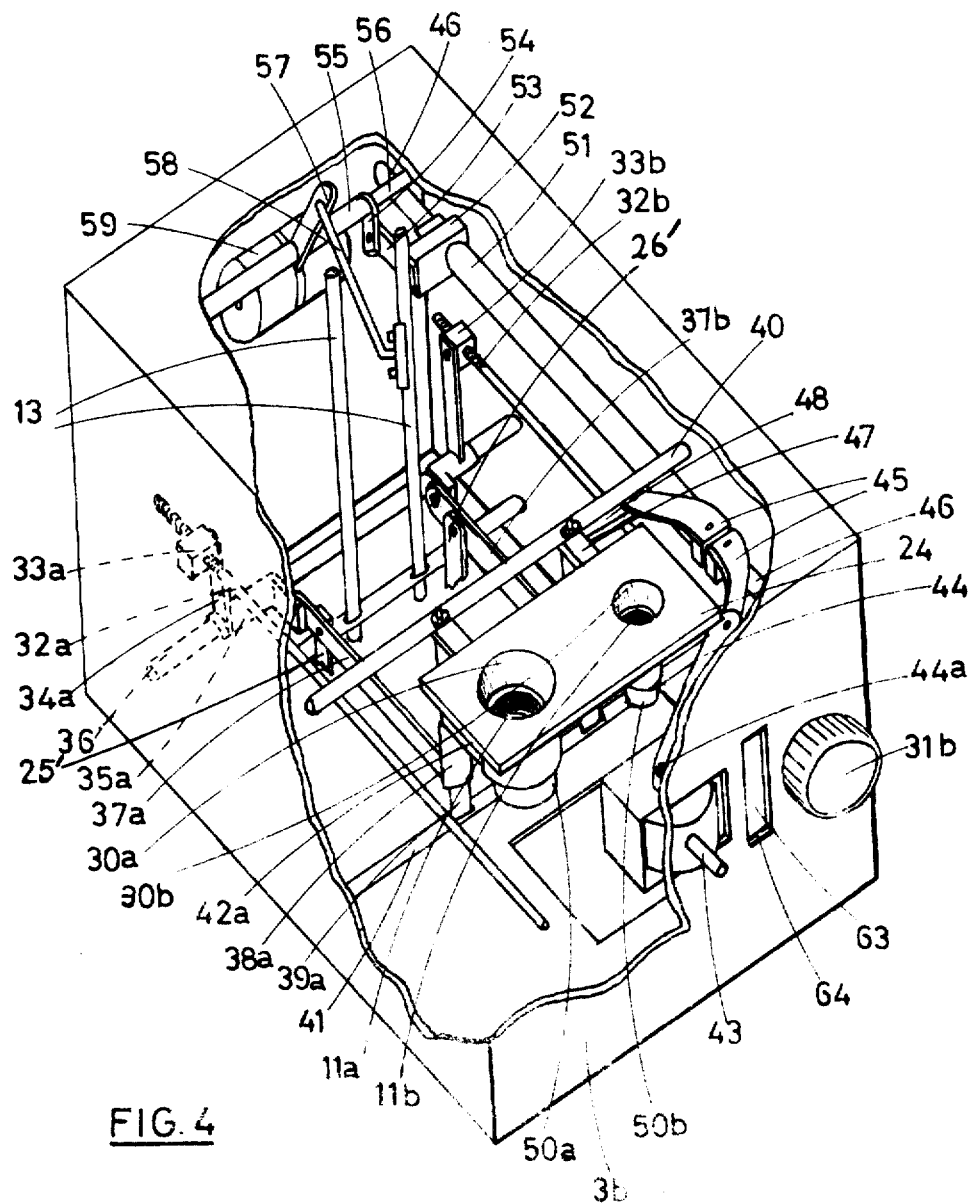
FIG. 4 is a partially cut-away view of the housing for the lens changing mechanism.

An arrangement of levers, see FIG. 4, allows the projecting lenses 11a and 11b to be interchanged depending on the magnification required.

The light rays pass out the projecting lens 11a or 11b in a divergent beam such that the image is beamed on a mirror 15 directly below. The mirror 15 is arranged at approximately 45° to the horizontal so as to reflect all the light to a further mirror 16 set at an angle of about 90° to the mirror 15. The light will then be reflected upwards to the screen 4 so as to give a non-distorted image on it.

Figure 5:
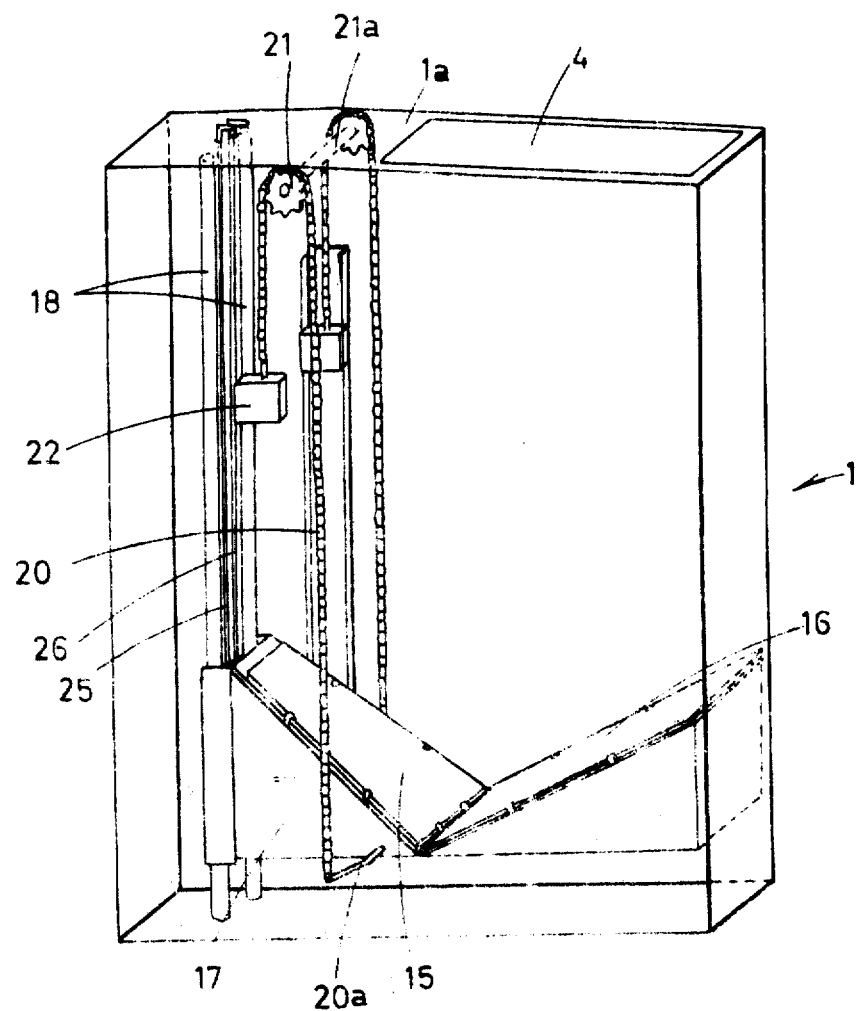
FIG. 5 is a partial side-on view of the interior of the cabinet.
Figure 6:
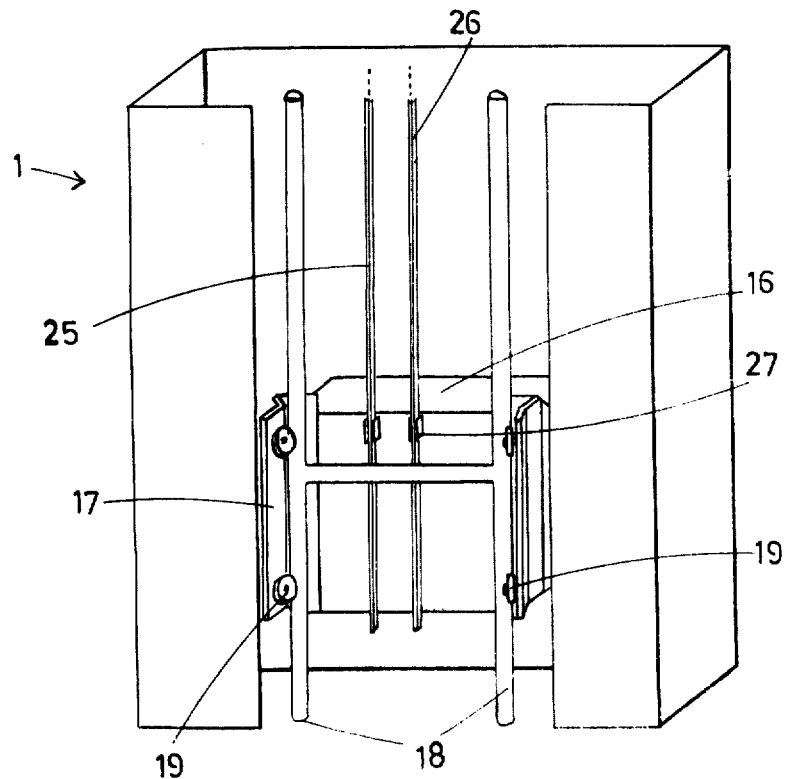
FIG. 6 is a view of portion of the interior of the cabinet seen from the rear.

Means are provided whereby the two mirrors 15 and 16 may be raised or lowered in relation to the viewing screen 4 and the projecting lens 11a or 11b whilst keeping the mirrors at a constant angle to each other and to the viewing screen and projecting lens. For this reason the two mirrors 15 and 16 are rigidly fixed to a framework 17 which is adapted to have up and down sliding movement within the cabinet 1, see FIGS. 5 and 6. The preferred means of obtaining this movement is by providing suitable upright stanchions 18 fixed within the cabinet and which will form a track for roller bearings 19 or the like journalled to the framework 17 supporting the mirrors 15 and 16. If for instance the section of framework bridging the stanchions is rectangular then a roller bearing 19 can be journalled adjacent each corner of the framework and the stanchions 18 so that the roller bearings will bear against the stanchions to allow the framework to have free vertical sliding movement and yet minimise any tilting of the framework. Other mechanical means for obtaining this movement will readily be apparent to those skilled in the art and this invention is not intended to be restricted to the single form of construction hereinbefore disclosed.

One preferred means for mechanically raising and lowering the mirror framework 17 may consist for instance of a chain 20, one end of which is attached to the framework at 20a, the chain passing over a sprocket wheel 21 with the other end of the chain being attached to a counter weight 22 which will approximately balance the combined weight of the mirrors 15 and 16 together with their associated framework 17. The sprocket wheel 21 is fixed to an axle 21a which is journalled within bearings attached to the cabinet, the axle 21a projecting through the cabinet to a hand wheel 23 (see FIG. 1) so that upon rotation of the hand wheel the framework 17 together with the associated mirrors 15 and 16 can be raised or lowered. By raising or lowering the framework 17 with the mirrors 15 and 16 the effective distance between the projecting lens 11a or 11b and the viewing screen 4 can be altered and thus the degree of enlargement can be correspondingly increased or reduced.

Since the effective length between the projecting lens 11a or 11b and the viewing screen 4 can be altered, means are also provided so that the correct focusing of the projecting lens can also be obtained to compensate for the change in the effective length of the said path. This focusing is arranged to occur automatically so that the image will remain in focus irrespective of the degree of enlargement. To obtain this correct focusing it is thus necessary to alter the position of the projecting lens 11a or 11b by an amount which is a predetermined fraction of the vertical movement of the mirror support framework 17.

According to the invention the method of automatically focusing the projecting lens 11a or 11b consists of a cam arrangement which is associated with the mechanism for vertically moving the mirror framework 17 so that a movement of the mirror framework will result in a corresponding movement of the projecting lens 11a or 11b.

The cam arrangement consists of two vertically disposed elongated camming members 25 and 26. FIG. 7 illustrates one of these members 25, and its associated mechanism and it will be understood that the other member 26 and associated mechanism is the same as that illustrated in FIG. 7. Each camming member as exemplified by 25 in FIG. 7, is pivoted via pivot point 251 to a fixed support. The upper end of camming member 25 has an L-shaped configuration, the end of the arm of this "L" having pivoted thereto a link 25'. Link 25' is, at its other end, pivotally connected to an arm 37a. One end of arm 37a carries a sleeve 38a mounted thereon for limited pivotal movement and slidably movable on a vertical rod 39a disposed between supports 40 and 41 (see FIG. 4). Affixed to sleeve 38a is a bracket 42a which in turn is secured to the lens housing 30a.

The camming member 25 extends downwardly inside cabinet 1 and engages slidingly with a cam-follower in the form of a slot 27 formed in or on the mirror support framework 17. A roller 271 is preferably located in slot 27 so that friction between the camming member and the framework is minimized.

The camming member 25 is shaped in such a manner that as the mirror support framework 17 travels upwards the camming member 25 pivots about pivot point 251, in an outward direction from the bottom, to cause link 25' to exert a pulling force on arm 37a to in turn cause sleeve 38a to slide down rod 39a and so to lower the lens housing 30a. When the mirror support framework 17 travels downward the motion of the mechanism is reversed and the lens housing raised. The shape of the camming edge of member 25 is such as to impart a faster movement to projecting lens 11a located in lens housing 30a, the closer the mirror supporting framework 17 approaches the screen 4. As it will be understood that the shape of the camming edge of member 25 will be a varying curve of very large radii indeed, camming members 25 and 26 appear in FIGS. 5 and 6 as being straight and in FIG. 7 the curvature of camming strips 25 is shown very greatly exaggerated for the sake of effect.

The other camming member 26 of the pair is similarly connected through a link 26', arm 37b, sleeve 38b on rod 39b, bracket 42b to lens housing 30b of projecting lens 11b.

Preferably the cam mechanism is so arranged that the lens housing can be bodily removed from the cabinet while leaving camming members 25 and 26 in place. One method of arranging this is to pivot the camming members to the cabinet and to provide removable pivot pins in the pivot holes in links 25' and 26'.

Control knobs 31a and 31b are provided to the projecting lenses 11a and 11b to be manually focused. These control knobs simply allow for the rotation of screw threaded rods 32a and 32b into associated screwing blocks 33a and 33b. Thus, rotation of the rod 32a results in the axial displacement of screwing block 33a which causes the bellcrank 34, pivoted to block 33a, and attached sleeve 35a to rotate about fulcrum 36 so as to impart an upward or downward motion to the arm 37a which in turn raises or lowers the sleeve 38a on the rod 39a running between supports 40 and 41. As the sleeve 38a is affixed to the bracket 42a, which in turn is secured to the lens housing 30a, a vertical movement is imparted to projecting lens 11a. A corresponding set of levers operates in a similar manner, when control knob 31b is rotated, so as to bring projecting lens 11b into focus. The arrangement is such that once the lens has been correctly focused, this focus is maintained by the lens mechanism and the associated cam arrangement during all the movements of the mechanism.

The mechanism for interchanging the projecting lenses 11a and 11b is associated with the control lever 43. Movement of the lever 43 to the left or right results in the arm 44 swinging in a horizontal plane about pivot 44a so that the slide 45 moves either forward or backward along the support 46 in order to transfer rotational movement to the member 47 by way of the bar 48. The member 47 is pivoted on the rod 39a which runs between supports 40 and 41. As the member 47 is rigidly attached to the projecting lens housing 30b and as both projecting lens housings 30a and 30b are fixed in a plate 24, a lateral movement is thus imparted to the projecting lenses to bring them into or out of line of the light beam.

Movement of the lever 43 simultaneously causes a vertical movement of the condensing lens 7b so as to keep the focal point thereof within the boundaries of the projecting lens. This is brought about by movement imparted to the sleeve 51 attached to the slide 45. A back or forward sliding motion of the sleeve 51 upon the support 46 results in the associated attachment 52 moving the arm 53 so as to rotate the limb 54, joined to the sheath 55, about the pivot 56. Rotation of the sheath 55 causes attached shank 57 to likewise rotate so as to impart an up or down movement to the condensing lens supports 13 by way of the pin 58. A counterweight 59 is also attached to the shank 57 and rotates about the pivot 56. The function of this counterweight is to ensure that all the levers pivot readily without necessitating too much force on control lever 43.

Screw threaded lens holders 50a and 50b in the projecting lens housings 30a and 30b allow the projecting lenses 11a and 11b to be focused by hand when the apparatus is being set up.

Projecting lens 11a is ideally adapted for 10× to having 20× magnification while projecting lens 11b is adapted for 20× to 40× magnification.

The film holder 14a has two dimensional movement in a horizontal plane, this being arranged by means of suitable racks and pinions (not shown in the accompanying drawings) as is known in the art. The back and forward movement of the film holder 14a is controlled by knob 60 located on the film holder support member 61 and the lateral movement by knob 62 on control panel 3b. The knobs 60 and 62 are attached to shafts (not shown in the drawings) which are suitably journalled and which are provided with the pinions which mesh with the racks so that rotation of the respective knobs provides appropriate longitudinal or lateral movement of the film holder 14a. The movable film holder is thus arranged for allowing selective portions of the film to be enlarged.

Means are provided whereby the degree of enlargement obtained from the film can be displayed on a suitable indicating device. One method of obtaining this is by attaching one end of an indicator strip 63 to the mirror support framework and passing the other end around the wheel in the lens mechanism housing and onto a counter weight. This indicator strip is viewable through a slot 64 in the control panel 3b and has indicia printed thereon which corresponds to the degree of enlargement. Thus, as the mirror support framework 17 is raised or lowered, the appropriate magnification figure can be viewed through the slot 64.

The control panel 3a has a switch to turn on the lights behind the indicator strips 63 for easy viewing and a knob with associated rheostat or other dimming mechanism to control the brightness of lamp 5.

It will be understood from the foregoing description that a certain degree of enlargement can be obtained between two limits. The greatest degree of enlargement will be obtained when the mirror framework is at the bottom of its travel to thus make the effective distance from the projection lens to the viewing screen as long as possible. Conversely the smallest degree of enlargement will be obtained when the mirror framework is at the top of its travel. If the greater degree of enlargement is desired than provision can be made for substitution of the projection lens with one of a different focal length. This can be arranged by any means as is known in the art so that one lens will enable enlargements up to a certain value to be obtained and then if a greater or lesser enlargement is required the other or second of the projection lenses can be brought into operation. For this purpose the mechanism to operate the automatic focusing is adapted so that it will operate on the particular projection lens being used. Similarly the manual focusing mechanism is also arranged to operate on the particular lens in use. Means are preferably provided to enable the desired lens to be brought into the operative position and to indicate which degree of enlargement is obtained by the particular lens. In order that a predetermined distance between the second portion of the condensor lens and the focal point of the projection lens can be maintained irrespective of which projection lens is being utilized, means are provided in association with the projection lens whereby the second portion of the condensor lens is movable vertically in relation to the projection lens.

What is claimed is:

1. An apparatus for projecting the image contained on transparent film onto a screen set at a fixed distance from the film, said apparatus being contained in a cabinet and including an optical arrangement whereby light issuing from a lamp is beamed through a primary condensing lens so as to emerge in a parallel beam and pass through a heat shield, reflect off a mirror, pass through a secondary condensing lens and converge through the film to a point within the boundaries of a projecting lens, diverge out of the projecting lens and pass onto a pair of angularly disposed reflecting surfaces before being reflected onto a transparent screen, and wherein the distance between the reflecting surfaces and the projecting lens and screen can be altered while a corresponding adjusting movement to the projecting lens is simultaneously effected to maintain the image in focus on the screen; characterised in that the adjusting movement is effected by means of a cam arrangement comprising a vertically disposed, elongated camming member pivoted at its upper end to said cabinet, a link pivotally connected to said camming member adjacent said upper end thereof, and connected to an arm carrying said projecting lens, and a cam-follower provided on a framework supporting the reflecting surfaces and slidably engaging the camming member; the camming member being shaped in such a manner that as the framework supporting the reflecting surfaces moves towards or away from the screen, the camming member is caused to pivot and thus to move said link which in turn moves said arm to produce said corresponding adjusting movement to the projecting lens.

2. The apparatus as claimed in claim 1, further including a mechanism for manually focussing the projecting lens, said mechanism comprising means for producing an adjusting movement to the projecting lens independently of that produced by the movement of the reflecting surfaces.

3. The apparatus as claimed in claim 2, wherein said manual focussing mechanism comprises a screw-threaded rod, a screwing block into which said rod screws to impart an axial displacement thereto; a bellcrank one leg of which is pivoted to said block and the other leg of which is pivotally connected to said arm to impart thereto a movement substantially normal to said axial displacement, which movement in turn produces said independent adjusting movement to the projecting lens.

4. The apparatus as claimed in claim 1, wherein the said shape of the camming member is also such that a faster adjusting movement is imparted to the projecting lens the closer the reflecting surfaces approach to the screen.

5. The apparatus as claimed in claim 1, but wherein there are two interchangeable projecting lenses, each having an associated camming member and manual focussing mechanism.

6. An apparatus for projecting the image contained on transparent film onto a screen set at a fixed distance from the film, said apparatus being contained in a cabinet and including an optical arrangement whereby light issuing from a lamp is beamed through a primary condensing lens so as to emerge in a parallel beam and pass through a heat shield, reflect off a mirror, pass through a secondary condensing lens and converge through the film to a point within the boundaries of a projecting lens system comprising two interchangeable projecting lenses, diverge out of the projecting lens system and pass onto a pair of angularly disposed reflecting surfaces before being reflected onto a transparent screen, and wherein the distance between the reflecting surfaces and the projecting lenses and screen can be altered while corresponding adjusting movements to the projecting lenses are simultaneously effected to maintain the image in focus on the screen, characterised in that the adjusting movement to each projecting lens is effected by means of an associated cam arrangement, each cam arrangement comprising a vertically disposed, elongated camming member pivoted at its upper end to said cabinet, a link pivotally connected to said camming member adjacent said upper end thereof, and connected to an arm carrying the projecting lens, and a cam-follower provided on a framework supporting the reflecting surfaces and slidably engaging the camming member; the camming member being shaped in such a manner that as the framework supporting the reflecting surfaces moves towards or away from the screen, the camming member is caused to pivot and thus move said link which in turn moves said arm to produce said corresponding adjusting movement to the projecting lens, a faster movement being imparted to the projecting lens the closer the reflecting surfaces approach the screen.

* * * * *